No. 847,466. PATENTED MAR. 19, 1907.
T. GARE.
VEHICLE TIRE.
APPLICATION FILED APR. 17, 1905.
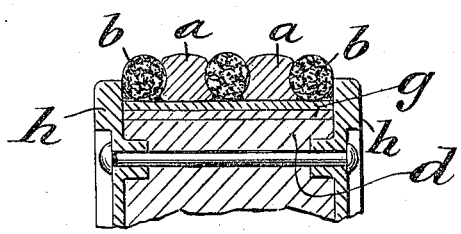
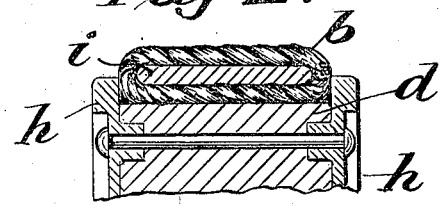
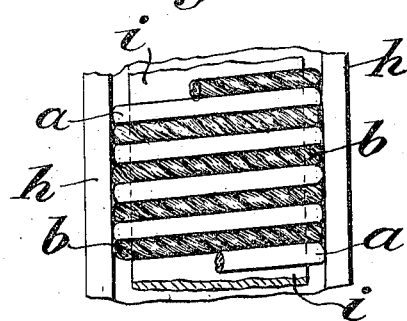
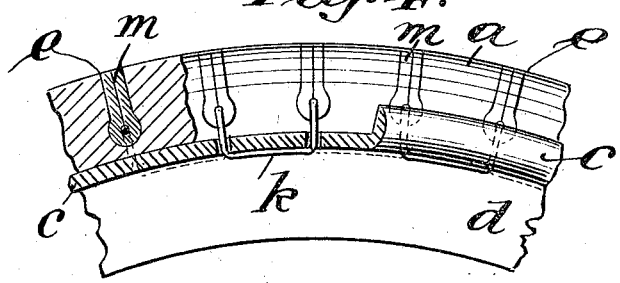
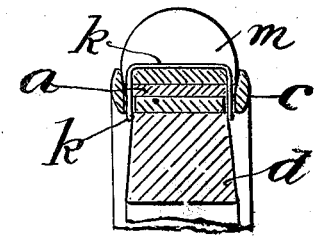
Witnesses.
Alfred Bosshardt.
Stanley E. Bramall.
Inventor.
Thomas Gare
Per J. Richards.
Attorney.

UNITED STATES PATENT OFFICE.

THOMAS GARE, OF NEW BRIGHTON, ENGLAND.

VEHICLE-TIRE.

No. 847,466.   Specification of Letters Patent.   Patented March 19, 1907.

Application filed April 17, 1905. Serial No. 256,085.

*To all whom it may concern:*

Be it known that I, THOMAS GARE, a subject of Great Britain, residing at New Brighton, in the county of Chester, Kingdom of Great Britain, have invented new and useful Improvements in and Connected with Vehicle-Tires, of which the following is a specification.

My invention relates to improvements in and connected with india-rubber vehicle-tires.

In practice it has been found that tires having a continuous rubber wearing-surface not affording sufficient grip are always liable to skid, particularly on slippery, wet, or greasy roads and when turning around corners, which not only considerably reduces the life of such tires, but also frequently causes accidents. Another cause which reduces the life of rubber tires is the rubber not being sufficiently confined or supported. The weight on the tire causes excessive cushioning, which soon splits and separates the rubber, and thus renders the tire useless before actually worn out.

My invention has for its object to obviate the said defects—that is to say, to provide a tire which is non-skidding, has a sure grip, prevents the rubber spreading and unduly wearing through excessive cushioning, and at the same time reduce the cost of rubber tires considerably.

To this end my invention consists in forming the wearing-surface of such tires so as to be partly of rubber and partly of fibrous material, the latter being rendered waterproof and so employed or used with the rubber in rope, band, cord, strip, or the like form or in sections as to laterally or circumferentially, or in both directions, support and thereby prevent the rubber from spreading, and the undue wear of the tire through excessive cushioning and at the same time taking up grit on the road provides the grip necessary to prevent skidding.

I attain these objects by the means illustrated in the accompanying drawing, in which—

Figures 1 and 2 are cross-sections, Fig. 3 a plan of Fig. 2, and Figs. 4 and 5 are respectively a sectional side view and a cross-section of various forms of tires constructed in accordance with my invention.

Similar letters refer to similar parts throughout the several views.

In carrying out my invention and referring to the figures generally, $a$ is the rubber, and $b$ the fibrous materials—say cotton, hemp, flax, jute, felt, leather, or the like—of which my improved wearing-surface or tire is composed; $c$ the rim, and $d$ the felly of the wheel.

Referring to Fig. 1 in this embodiment the tire is composed of india-rubber strips $a$ and fibrous ropes $v$, arranged alternately side by side direct upon the felly $d$ or periphery of the wheel-body or, as shown, upon a flexible seat $g$, say, formed of cotton belting, rubber, or the like, and between flanges $h$, secured to the side of the felly $d$ or wheel-body. The said fibrous ropes laterally supporting the said rubber strips prevent the latter from spreading and thus excessive cushioning.

A further embodiment of my invention consists, Figs. 2 and 3, in winding a strand of india-rubber $a$ and a strand of fibrous rope $v$ side by side jointly around a cotton belt $i$ or other suitable flexible body and seating the same upon the felly $d$ or wheel-body and between flanges $h$, secured thereto. In this case the india-rubber $a$ is more circumferentially supported by the fibrous rope $b$ and the two strands also cross each other.

According to another embodiment of my invention, Figs. 4 and 5, I may form cross grooves or slits $e$ in the rubber or tire $a$ and force into the same strips of felt or other fibrous material $m$ and secure same therein and at the same time the tire $a$ to the rim $c$ of the wheel by a wire $k$ passing through holes in the latter.

What I claim as my invention, and desire to secure by Letters Patent, is—

1. In a vehicle-tire, a wearing-surface composed partly of rubber and partly of textile fibers in a manufactured form each of a uniform thickness arranged side by side to alternately bear against each other, the said textile fibers uniformly supporting the said rubber, all substantially as and for the purpose set forth.

2. In a vehicle-tire, a wearing-surface composed partly of rubber and partly of fibrous material both in rope form arranged longitudinally side by side, the india-rubber being situated between the said flexible material and thereby supported and prevented from spreading, substantially as and for the purpose set forth.

3. In a vehicle-tire, a wearing-surface composed partly of rubber and partly of flexible material, a core around which the said rubber and flexible material are jointly wound in rope form, the said rubber being supported and prevented from spreading by the said flexible material, all substantially as set forth.

In testimony whereof I have signed my name to this specification in the presence of two subscribing witnesses.

THOMAS GARE.

Witnesses:
ALFRED BOSSHARDT,
STANLEY E. BRAMALL.